Feb. 1, 1938.   V. S. SHAW   2,107,190
PLASTIC EXTRUSION MOLDING PRESS
Filed May 15, 1936   12 Sheets-Sheet 8

Inventor
VICTOR S. SHAW,
By Toulmin & Toulmin
Attorneys

Feb. 1, 1938. V. S. SHAW 2,107,190
PLASTIC EXTRUSION MOLDING PRESS
Filed May 15, 1936 12 Sheets-Sheet 11

FIG.12.

Inventor
VICTOR S. SHAW,
BY
Toulmin & Toulmin
Attorneys

Feb. 1, 1938. V. S. SHAW 2,107,190
PLASTIC EXTRUSION MOLDING PRESS
Filed May 15, 1936 12 Sheets-Sheet 12

FIG.13.

Inventor
VICTOR S. SHAW,
Toulmin & Toulmin
Attorneys

Patented Feb. 1, 1938

2,107,190

UNITED STATES PATENT OFFICE 2,107,190

PLASTIC EXTRUSION MOLDING PRESS

Victor S. Shaw, Cardington, Ohio, assignor to The Hydraulic Press Corporation, Inc., Wilmington, Del., a corporation of Delaware

REISSUED
SEP 23 1941

Application May 15, 1936, Serial No. 79,954

12 Claims. (Cl. 18—30)

This invention relates to injection or extrusion presses, and especially to extrusion presses for molding thermoplastic materials like cellulose acetate, which can be re-softened and re-molded by heat after cooling, as contrasted with materials like phenol resins which acquire a permanent set upon cooling.

One object of this invention is to provide an extrusion press having die members movable into engagement with an injector, and a charging and feeding arrangement for supplying measured quantities of materials to the press.

Another object is to provide a hydraulic circuit including such a press and charging and feeding arrangement, in combination with pumps for operating the hydraulic plungers, which move the dies and injector into engagement with one another, and which also operate the charging and feeding mechanism.

Another object is to provide such a press wherein the charging arrangement is operatively connected to the feeding arrangement so that the former distributes measured charges to the latter in proportion to the quantity required by the latter.

Another object is to provide a charging and feeding arrangement having means for heating the thermoplastic materials during the charging and feeding operations, together with means for varying the temperatures applied to different portions of the press, although the heat is supplied from a common source.

Another object is to provide a heating arrangement for applying different degrees to different parts of a machine, this heating arrangement consisting of means for heating a fluid and distributing this fluid to different parts of the machine, together with a by-passing arrangement for by-passing a portion of the fluid past a certain part of the machine so as to lower the temperature of the portion which is by-passed.

Another object is to provide a hydraulic extrusion press having independent sources of supplying pressure fluid to the die clamping cylinders and to the injection or extrusion cylinders so that the clamping pressure may be maintained at a different pressure level from the injection or extrusion pressure or be kept independent thereof.

General arrangement and hydraulic circuit

Figure 1:
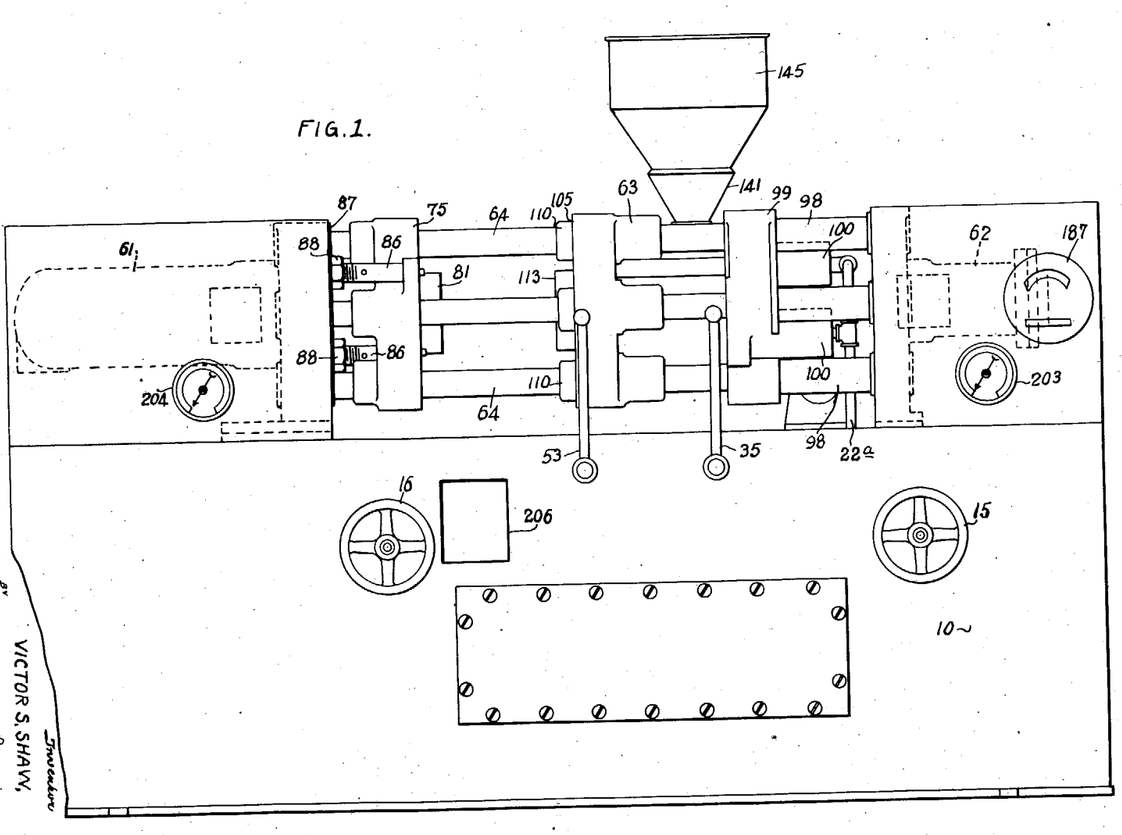
Figure 1 is a front elevation of the injection or extrusion molding press of this invention.
Figure 2:
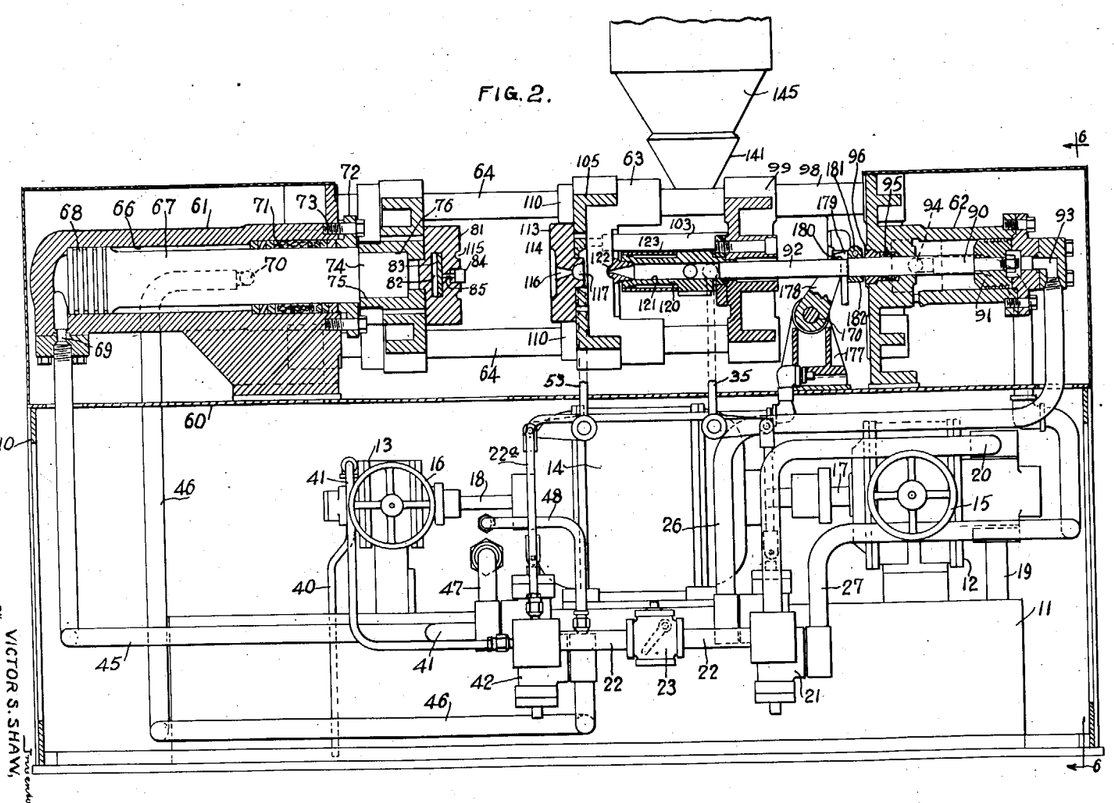
Figure 2 is a view of the press shown in Figure 1, with the upper portion in vertical section through the axis of the clamping plunger, and with the lower portion shown in front elevation, with the front of the machine removed to disclose the mechanism therein.

Referring to the drawings in detail, Figures 1 and 2 show the press of this invention as consisting of a base, generally designated 10, forming a frame for supporting the various portions of the press, and also inclosing a fluid tank 11 for containing the operating fluid, such as oil, by which the various hydraulic members are actuated. Mounted upon the tank 11 are hydraulic pumps 12 and 13, operated by a motor 14. The hydraulic pump 12 is of a conventional type, and is fitted with a pressure and volume control operated by the hand wheel 15. The latter acts upon the variable stroke mechanism in the pump 12 in such a manner as to cause a variable output of pressure fluid at working pressures, this output decreasing to zero at a predetermined maximum or peak pressure. Such servomotor control arrangements for hydraulic pumps are known to those skilled in the art, and the details thereof form no part of the present invention.

The hydraulic pump 13, on the other hand, is fitted with a pressure control operated by the hand wheel 16. This control acts upon the variable stroke mechanism of the pump 13 in such a manner as to give a full volume delivery of pressure fluid at working pressures, the arrangement reducing the output to zero at a predetermined maximum or peak pressure. This control is also known to those skilled in the art, and its details also form no part of the present invention.

The pumps 12 and 13 are driven from the motor 14 through the shafts 17 and 18, respectively, (Figure 2). The pump 12 receives fluid through the suction line 19, running from it to the tank 11, and discharges pressure fluid into the line 20, running to the injection control valve 21. The branch line 22 continues onward from the pressure line 20, and distributes pressure fluid through the check valve 23 and the line 22a to the pistons supporting one of the die members, as hereinafter explained.

From the ports 24 and 25 of the injection control valve 21 the lines 26 and 27 run, respectively, to the opposite sides of the injection piston of the press, as hereinafter explained. From the end ports 28 and 29 the line 30 discharges into the fluid tank 11. The injection control valve 21 contains a valve member 31, having valve heads 32 and 33, these being shifted bodily by means of the crank arm 34 operated by the injection control valve hand lever 35. As the hand lever 35 is moved to and fro the valve heads 32 and 33 are moved upwardly or downwardly within the valve 21 so as to distribute fluid either to the line 26 or to the line 27, as desired.

Figure 11:
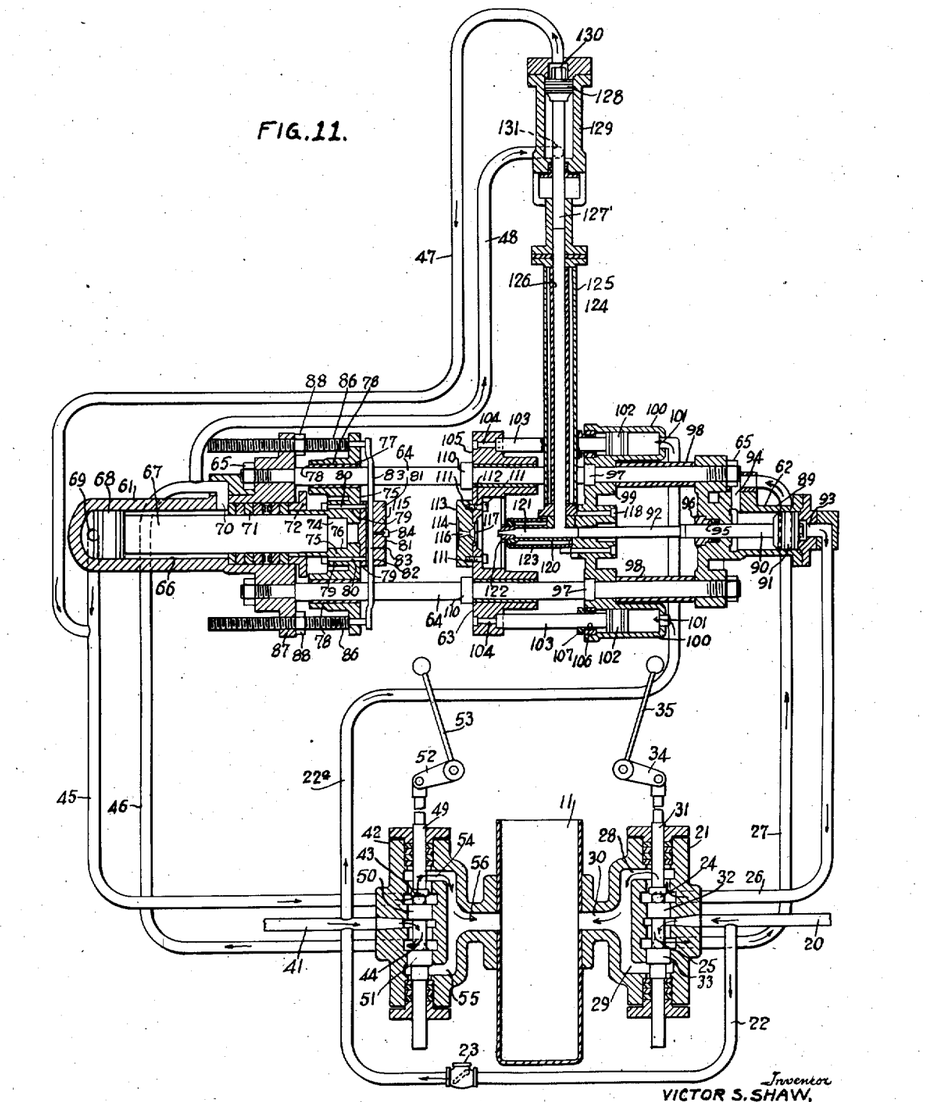
Figure 11 is a diagrammatic sectional view of the press and its hydraulic circuit, with the various plungers in a retracted position.

The hydraulic pump 13 receives fluid from the tank 11 by way of the suction line 40, and discharges pressure fluid through the line 41 leading to the clamping control valve 42 (Figures 2 and 11). The line 41 is likewise connected to the branch line 22a between the check valve 23 and the press. The check valve 23 prevents the return flow of fluid toward the pump 12 when the pump 13 is operating, but when the pump 12 is in a non-delivery position. From the ports 43 and 44 of the clamping control valve 42 the lines 45 and 46 lead, respectively, to the opposite sides of the clamping plunger of the extrusion press, as hereinafter explained. From the line 45 the branch line 47 carries fluid to one side of the charging plunger of the press, the opposite side of which is connected by the branch line 48 to the line 46, as hereinafter explained. The clamping control valve 42 likewise contains a valve member 49, having spaced valve heads 50 and 51 arranged to be moved to and fro by the crank arm 52, operated by the clamping control valve hand lever 53. The hand lever 53 may be moved in one direction or the other to distribute fluid from the line 40 alternately to the line 45 or 46, as desired. From the end ports 54 and 55 the return line 56 runs to the tank 11.

*Extrusion molding press construction*

The extrusion molding press parts are mounted upon the base 10 (Figures 1 and 2), and are arranged upon the top member 60 thereof. The clamping cylinder assembly 61 is mounted upon the left-hand side of the base top member 60, the injecting cylinder assembly 62 is mounted upon the right-hand end thereof, and the cushioning plunger assembly 63 is arranged between the assemblies 61 and 62, these being interconnected by the strain rods 64 secured thereto by the nuts 65 (Figure 11) threaded upon the ends of the strain rods 64.

The clamping cylinder assembly 61 consists of the cylinder bore 66, having the clamping piston 67 with the piston head 68 reciprocable therein. At one end of the cylinder bore 66 the port 69 is connected to the line 45 leading to the clamping control valve 42. On the opposite side of the piston head 68 is situated the port 70, connected to the line 46, likewise leading to the clamping control valve 42. The packing 71, compressed by the gland 72 through the agency of the cap screws 73, prevents leakage from around the clamping piston 67. The opposite end of the clamping piston 67 from the clamping piston head 68 has a reduced diameter portion 74, upon which is mounted the die head 75 having the bore 76 arranged to receive the reduced diameter portion 74. The outer ends of the die head 75 are provided with bores 77 containing bushings 78 surrounding and engaging the strain rods 64 (Figure 11) so as to provide a sliding engagement.

The die head 75 is also provided with drilled portions 79 adapted to receive the bolts 80, for securing the die member 81 thereto. The die member 81, in turn, is provided with a lateral bore 82 arranged to receive a knock-out rod 83, the central portion of which is provided with a knock-out pin 84 mounted in the drilled portion 85 of the die member 81. The outer ends of the knock-out rod 83 are adapted to engage the ends of the threaded stops 86, these being mounted in the threaded bores 87 of the clamping cylinder assembly 61, and locked in position by means of the locknuts 88 (Figure 11). The purpose of the knock-out rod 83 and knock-out pin 84 is to eject the molded piece from the die member 81 when the rod 83 is carried back into contact with the ends of the threaded stops 86 on the return motion of the clamping plunger 67.

The injecting cylinder assembly 62 consists of the cylinder bore 89, containing the piston rod 90 having the piston head 91 secured at one end, and the injector plunger 92 mounted upon the other end (Figure 11). The cylinder bore 89 is provided with ports 93 and 94 at its opposite ends, respectively connected by the lines 26 and 27 to the injection control valve 21. The packing 95, compressed by the gland 96, prevents escape of fluid around the piston rod 90. Mounted upon the strain rods 64 and held in position between the enlargements 97 thereof and the spacing bushings 98 engaging the injecting cylinder assembly 62, is the cross-piece 99. This cross-piece contains the cushioning cylinder bores 100, having the ports 101 connected by the lines 22a and 22 to the control valves 21 and 42, respectively.

Mounted to reciprocate in the cylinder bores 100 are the piston heads 102 connected to the piston rods 103, the opposite ends of which are secured, as at 104, to the crosshead 105. The leakage of fluid around the piston rods 103 is prevented by means of the packings 106, arranged to be compressed by the glands 107. The crosshead 105 is provided with bores 108 containing bushings 109 adapted to provide sliding engagement with the strain rods 64, the latter having annular enlargements 110 serving as stops to limit the forward movement of the crosshead 105.

Mounted upon the crosshead 105 and secured thereto, as by the bolts 111 passing through the holes 112, is the die member 113, cooperating with the previously-mentioned die member 81. The die member 113 is provided with a die recess 114 aligned with the recess 115 in the die member 81. Access to these recesses 114 and 115 is provided by means of the passageway 116 extending rearwardly through the die member 113, and terminating in the mouth 117 (Figure 11).

Secured to the cross-piece 99, as by the bolts 118 running through the bolt holes 119, is the injector cylinder 120, within the bore 121 of which the injector plunger 92 operates. The injector cylinder 120 is provided with a nozzle or nose portion 122, the tip of which is adapted to fit snugly within the mouth 117 of the passageway 116 in the die member 113 when the latter is moved into engagement therewith, as hereinafter described.

The injector cylinder 120 is surrounded by a casing 123, providing a chamber for the circulation of heating fluid for maintaining the molding material in a plastic condition, as hereinafter explained. Projecting laterally from the injector cylinder 120 is a charging cylinder 124, similarly surrounded by a casing 125 for providing a chamber for the circulation of heating fluid therebetween. The charging cylinder 124 is provided with a bore 126, within which the charging plunger 127 is arranged to reciprocate. On the oposite end of the charging plunger 127 is mounted the piston head 128, arranged to reciprocate within the cylinder 129. The opposite ends of the cylinder 129 are provided with ports 130 and 131, connected respectively to the lines 47 and 48, previously described (Figure 11).

*Material-measuring and charging arrangement*

Figures 7, 14:
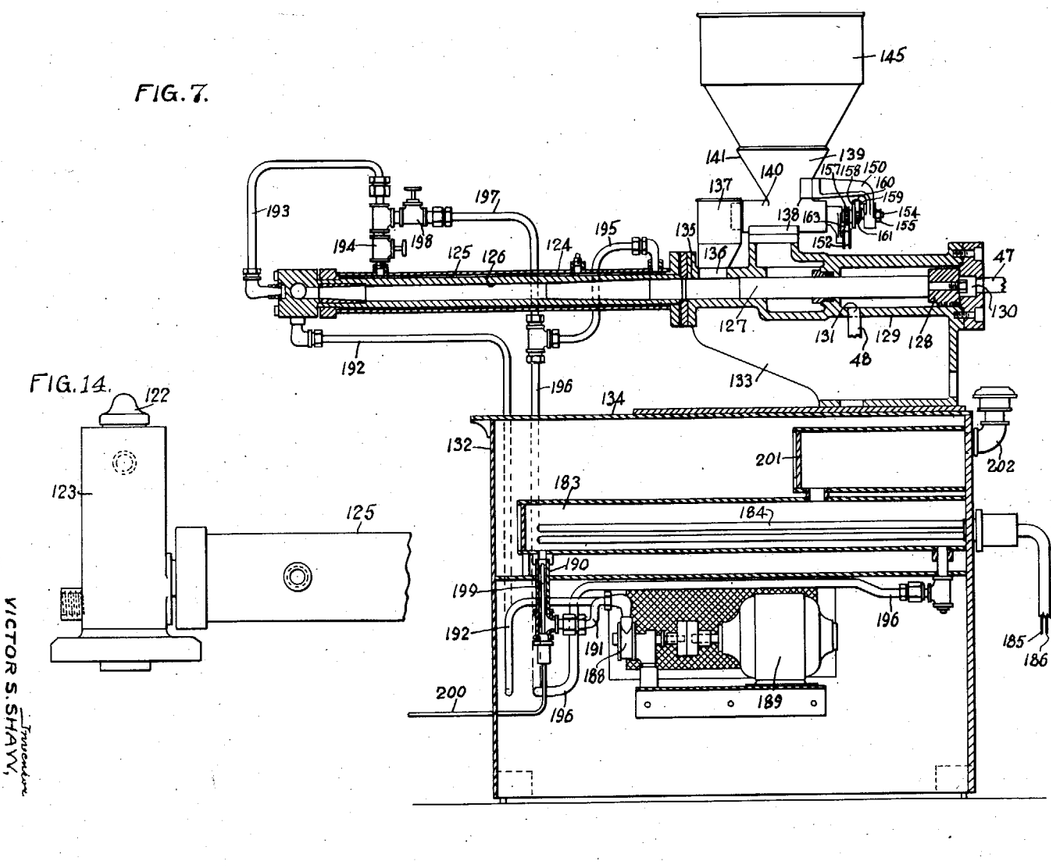
Figure 7 is a central vertical section through the charging, heating and feeding arrangement of the press.
Figure 14 is a plan view of the extreme left-hand portion of Figure 7, showing the exterior appearance of the injecting and charging devices.

The material-measuring and charging devices are mounted upon a hollow base 132, extending rearwardly approximately at right angles to the main portion of the press (Figure 7). The cylinder 129, containing the piston head 128 for operating the charging plunger 127, is supported by the bracket 133 mounted upon the top portion 134 of the base 132. The charging cylinder bore 126 is aligned with a bore 135 (Figure 7), having an aperture 136 in one side thereof. Above this aperture 136 is arranged a funnel member 137, adapted to direct materials through the aperture 136 into the bores 135 and 126.

Figures 8, 15:
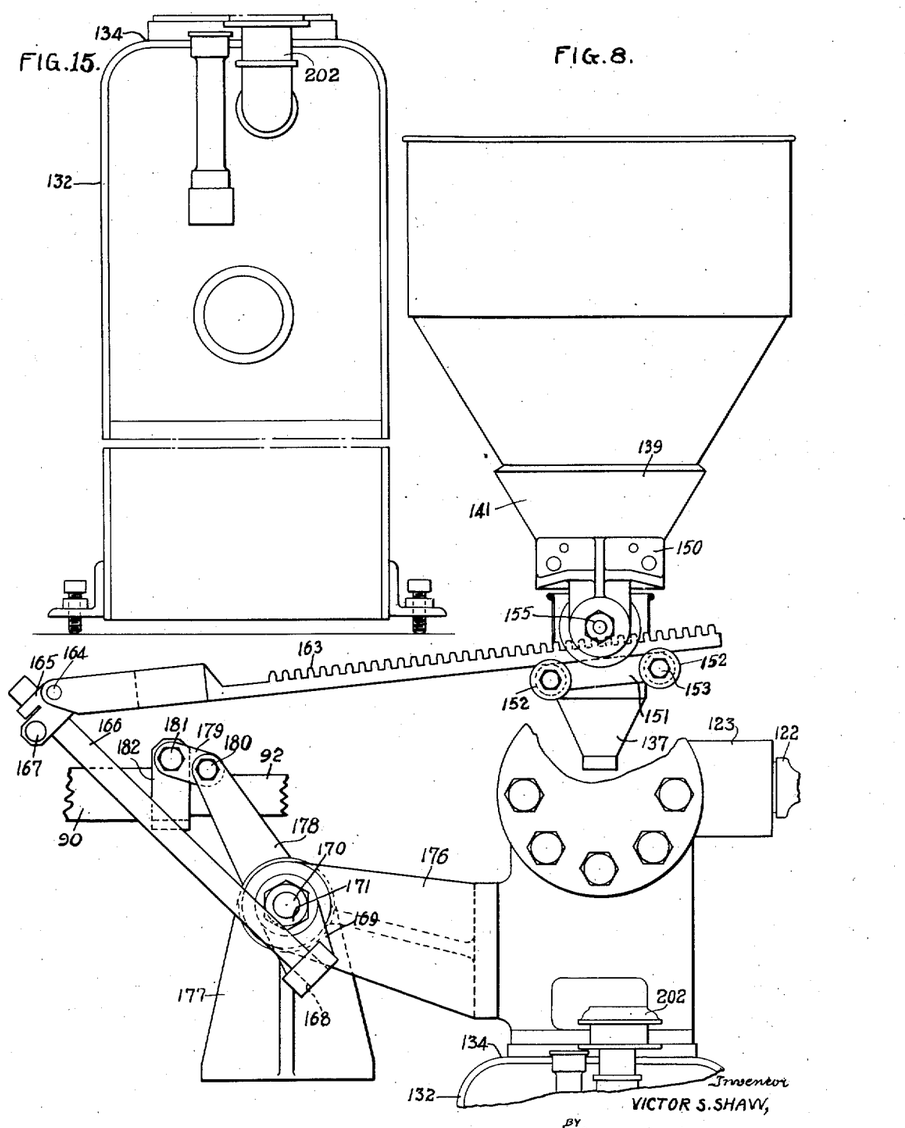
Figure 8 is a detail view of the mechanism interconnecting and synchronizing the injecting mechanism with the charging mechanism.
Figure 15 is an elevational view of the supporting structure for the mechanism shown in Figure 8.
Figures 9, 10:
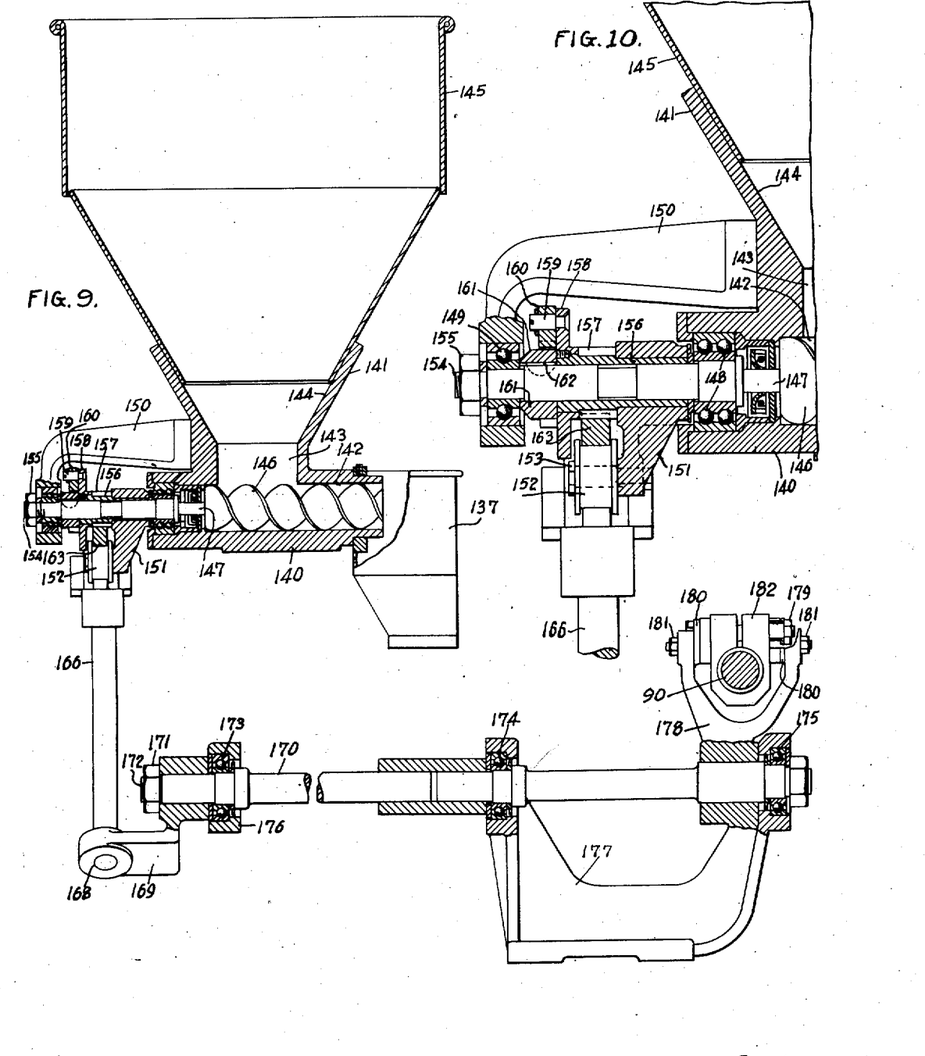
Figure 9 is a view of the mechanism shown in Figure 8, but partly in section, in a plane at right angles to the view shown in Figure 8.
Figure 10 is an enlarged sectional view of the mechanism shown at the left-hand side of Figure 9.

The cylinder 129 is provided with a projection 138, this projection on the upper side of the cylinder 129 being adapted to support the charge-measuring assembly, generally designated 139. The latter consists of a casing 140, having a conical upwardly extending portion 141 and a horizontal cylindrical bore 142 connected therewith by the vertical passage way 143. The conical portion 141 is provided with an interior conical surface 144 adapted to receive the conical lower portion of a hopper 145. The outer end of the bore 142 is conected to the funnel 137, so as to discharge into this funnel. Arranged to rotate within the bore 142 is a material-moving screw conveyor 146, mounted upon the shaft 147 (Figures 9 and 10), the latter being journalled in the anti-friction bearings 148 and 149, the latter being supported by the bracket 150 extending rearwardly from the casing 140. Surrounding the shaft 147 is a downwardly depending bracket 151, arranged to support the guide rollers 152 secured thereto, as by the cap screws 153 (Figures 8 and 10). The outer end of the shaft 147 terminates in a threaded portion 154 having the retaining nut 155 mounted thereon.

Surrounding the shaft 147 for free rotation thereon is the sleeve 156, containing the teeth of the gear portion 157 and having mounted thereon the disc 158, carrying the stub shaft 159 upon which is mounted the ratchet pawl 160. The latter is arranged to engage the ratchet wheel 161, which is secured by the key 162 to the shaft 147. Supported by the guide rollers 152 and arranged to engage the teeth of the gear portion 157, is a rack 163 (Figure 8), one end of which is pivotally mounted upon the pin 164 secured to the split collar 165. The latter is clamped to the arm 166 by means of the bolt 167. The inner end of the arm 166 is secured within the bore 168 in the crank arm 169 mounted upon the end of the shaft 170, and held in position by the nut 171 upon the threaded portion 172 thereof (Figures 8 and 9.) The shaft 170 is supported in anti-friction bearings 173, 174 and 175. The bearings 173 are mounted in a bracket 176 secured to the bracket 133. The anti-friction bearings 174 and 175, however, are mounted in a bracket 177, the lower portion of which rests upon the top member 60 of the main base 10 of the press.

Mounted upon the oposite end of the shaft 170 from the crank arm 169 is a bifurcated arm 178 (Figure 9), the outer ends of which are pivotally connected, as at 180, to links 179 (Figure 2). The opposite ends of the links 179 are pivotally connected, as at 181, to a collar 182 mounted upon the piston rod 90. Consequently, the reciprocation of the piston rod 90 and the injector plunger 92 will cause the bifurcated arm 178 to rotate the shaft 170, and move the arm 166 and the rack 163 to and fro by amounts directly proportional to the motion of the piston rod 90. As the rack 163 moves to the left (Figure 8) it will rotate the gear 157, and with it the disc 158, but the pawl 160 will slip loosely over the ratchet wheel 161 without engagement therebetween. Consequently, no rotation is imparted to the shaft 147 during the return motion of the injector plunger 92 and its position rod 90. During the injection stroke thereof, however, the gear 157 and disc 158 will be rotated in the opposite direction by the motion of the rack 163 to the right (Figure 8), whereupon the pawl 160 (Figure 10) will operatively engage the ratchet wheel 161 and rotate the shaft 147. The rotation of the shaft 147 and screw conveyor 146 will cause material placed in the hopper 145 to move to the right (Figure 9), and be expelled into the funnel 137 and thence through the aperture 136, into the charging cylinder bores 135 and 126. The charging then takes place by the action of the charging plunger 127 as impelled by the piston head 128, in a manner subsequently to be described.

*Heating arrangement for maintaining materials in plastic condition*

The molding material is maintained in a plastic condition by the circulation of heated oil around the various chambers through which the material passes. The oil is contained in a reservoir 183 mounted within the base 132 and heated by means of an electrical heating unit 184, which is connected by the lines 185 and 186 (Figure 7) to the indicating thermostat 187 (Figure 1). The oil is circulated from the reservoir 183, throughout the various chambers, by means of a pump 188 driven by the motor 189. The fluid is drawn from the reservoir 183, through the passageway 190 and the line 191, into the pump 188, from which it is expelled through the line 192, into the chamber between the injector cylinder 120 and its surrounding casing 123 (Figures 7 and 11). From this chamber the oil flows through the pipe 193 and valve 194, into the chamber between the charging cylinder 124 and its surrounding casing 125. The oil then flows from the opposite end of the chamber, through the lines 195 and 196 into the reservoir 183. The line 193 is connected to the line 196 by the by-pass line 197, containing the by-pass valve 198.

The oil in the reservoir 183 is heated by the heating unit 184 in response to the control of the thermostat 187. The heated oil, in passing through the passageway 190 on its way to the pump 188, surrounds the bulb 199, which is connected by the conduit 200 to the thermostat 187 so that the thermostat responds to the temperature of the oil surrounding the bulb 199 and imparts its control to the electrical heating unit 184 through the lines 185 and 186 leading thereto. The heated oil reaches the reservoir 183 from an ante chamber 201, access to which is obtained through the filling connection 202 (Figure 7).

The indicating thermostat 187 is mounted in a convenient location upon the front of the press, as shown in Figure 1. Also mounted in similar locations are the pressure gauges 203 and 204, arranged to indicate the pressure existing in the injecting and clamping circuits, respectively. The hand wheels 15 and 16 for controlling the pumps 12 and 13 and the hand levers 35 and 53 also project from the front apron of the press base, where they may be conveniently manipulated by the operator.

Operation

Before operating the press the various plungers are placed in retracted positions by shifting the control valve hand levers 35 and 53 away from one another, as shown in Figure 11. The pumps 12 and 13 are then started by starting the motor 14, and the heating fluid pump 188 is operated by starting the motor 189. With the valves 21 and 42 in the positions shown in Figure 11, pressure fluid flows from the pump 12, through the line 20, into the bore of the valve 21, thence through the port 25, the line 27 and the port 94, into the space to the left of the piston head 91 within the injection cylinder bore 89, forcing the piston head 91 to the right and retracting the injector plunger 92. At the same time fluid flows from the line 20, through the branch line 22, the check valve 23, the line 22a and the ports 101, into the cushioning cylinders 100, where this fluid acts against the piston heads 102 to force the crosshead 63 and die member 113 to the left.

Meanwhile, the fluid expelled from the opposite end of the injection piston cylinder 89 returns to the tank 11 by way of the port 93, line 26, the valve ports 24 and 28 and the line 30. During this time the pump 13 discharges pressure fluid through the line 41, into the clamping control valve 42, thence through the port 44 and the line 46, into the space to the right of the clamping piston head 68, forcing the piston head to the left and with it the die member 81. The pressure fluid also continues from the line 46, through the line 48 and the port 131, into the cylinder 129, where it acts against the piston 128 to move the charging plunger 127 into its retracted position. The fluid expelled from the opposite sides of the piston heads 128 and 68 passes through the lines 47 and 45, the port 43 of the control valve 42, and the port 54 and line 56, into the tank 11.

Figure 12:
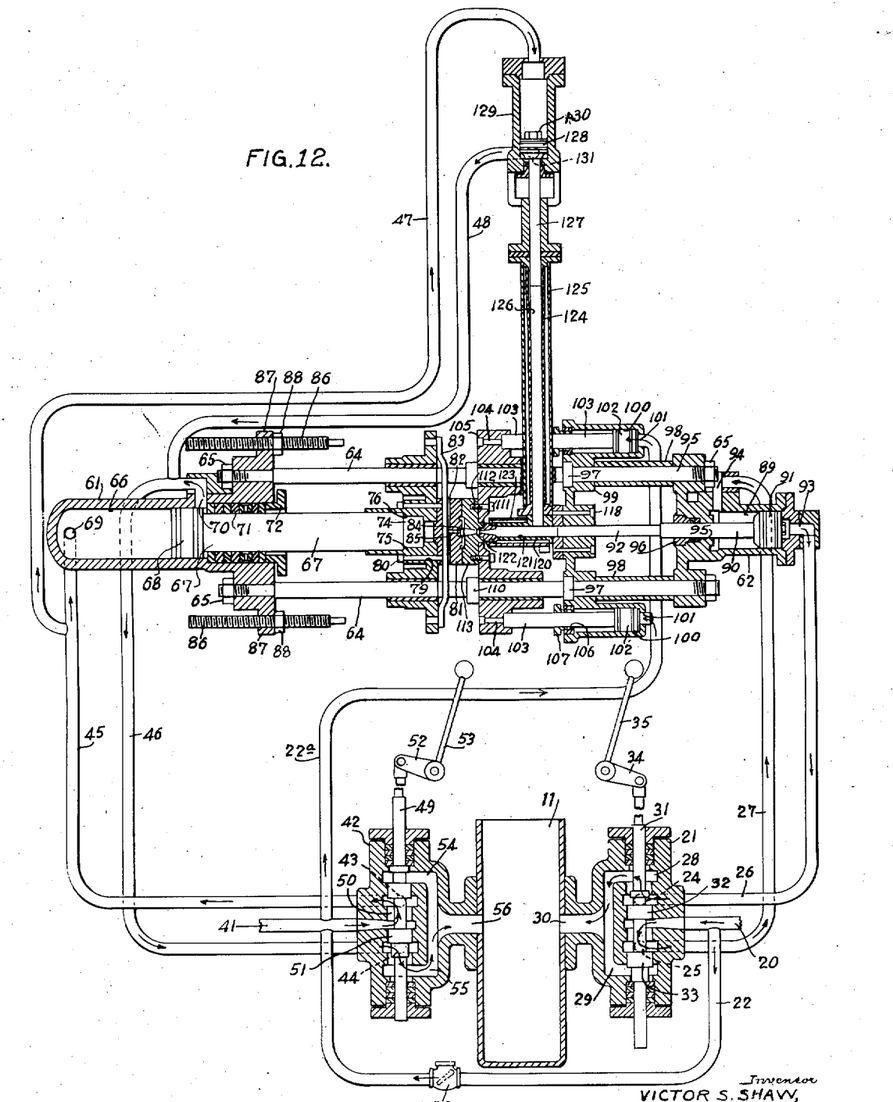
Figure 12 is a view similar to Figure 11, but with the die members moved into engagement with the injector, and with the injection operation about to take place.

To place the clamping plunger and dies in engagement with one another and with the injector, the hand lever 53 is moved to the right into the position shown in Figure 12. In this position the pressure fluid flows from the control valve 42, through the line 45, into the space to the left of the clamping piston head 68, forcing the latter inwardly until the die member 81 engages the die member 113. When this occurs the die member 113 is forced rearwardly until its mouth 117 comes into engagement with the nose 122 of the injector. The impact is cushioned by the gradual yielding of the cushioning piston heads 102 in the face of the superior thrust of the clamping plunger 67.

Figure 13:
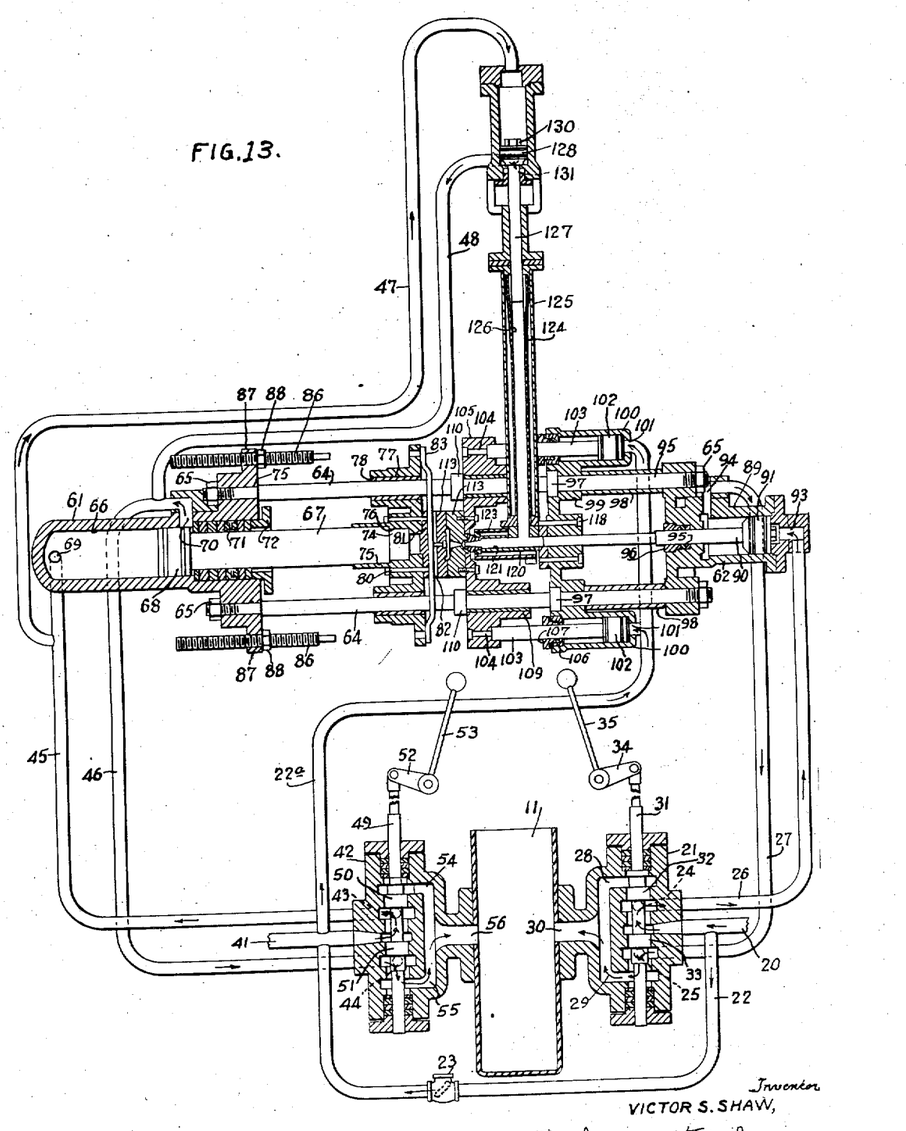
Figure 13 is a view similar to Figures 11 and 12, but showing the positions of the parts and control levers after the injection operation has taken place.

While this is occurring pressure fluid passes from the line 45, along the line 47 and through the port 130, into the cylinder 129 (Figure 11), where it acts against the piston head 128, forcing it inwardly and directing a charge of the molding material into the injector cylinder 120. The parts have now arrived in the positions shown in Figure 12, with the two die members 81 and 113 in engagement with one another and with the injector. To cause the injector plunger 92 to force the plastic material into the space beween the molds, the hand lever 35 is now moved to the left until it occupies the position shown in Figure 13. Under these conditions pressure fluid now passes from the injector control valve 21, through the line 26 and the port 93, into the space to the right of the injector piston head 91, causing the piston head 91, the piston rod 90 and the injector plunger 92 to move to the left, forcing a charge of the plastic material through the passageway 116 into the recesses 114 and 115 in the die members. Meanwhile, the material has been maintained in a plastic condition by reason of the circulation of the heated oil from the reservoir 183 through the lines previously described, and through the chambers surrounding the charging cylinder 124 and injector cylinder 120.

Figure 3:
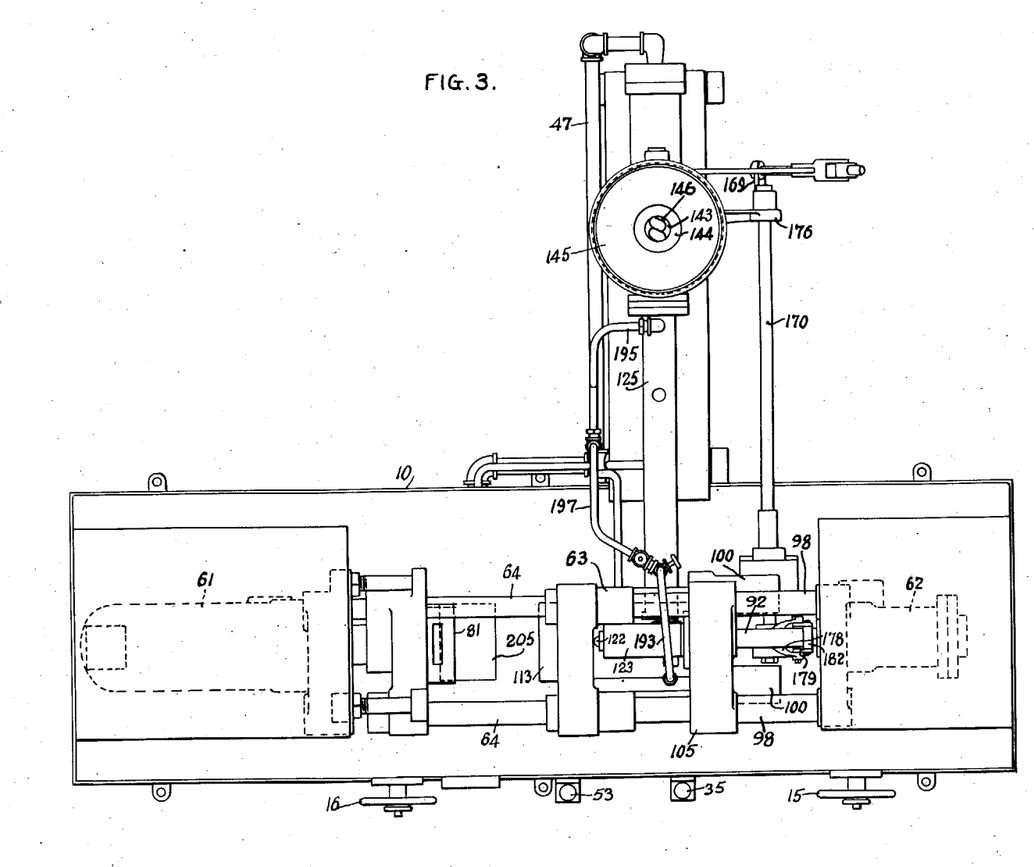
Figure 3 is a top plan view of the press shown in Figures 1 and 2.
Figure 4:
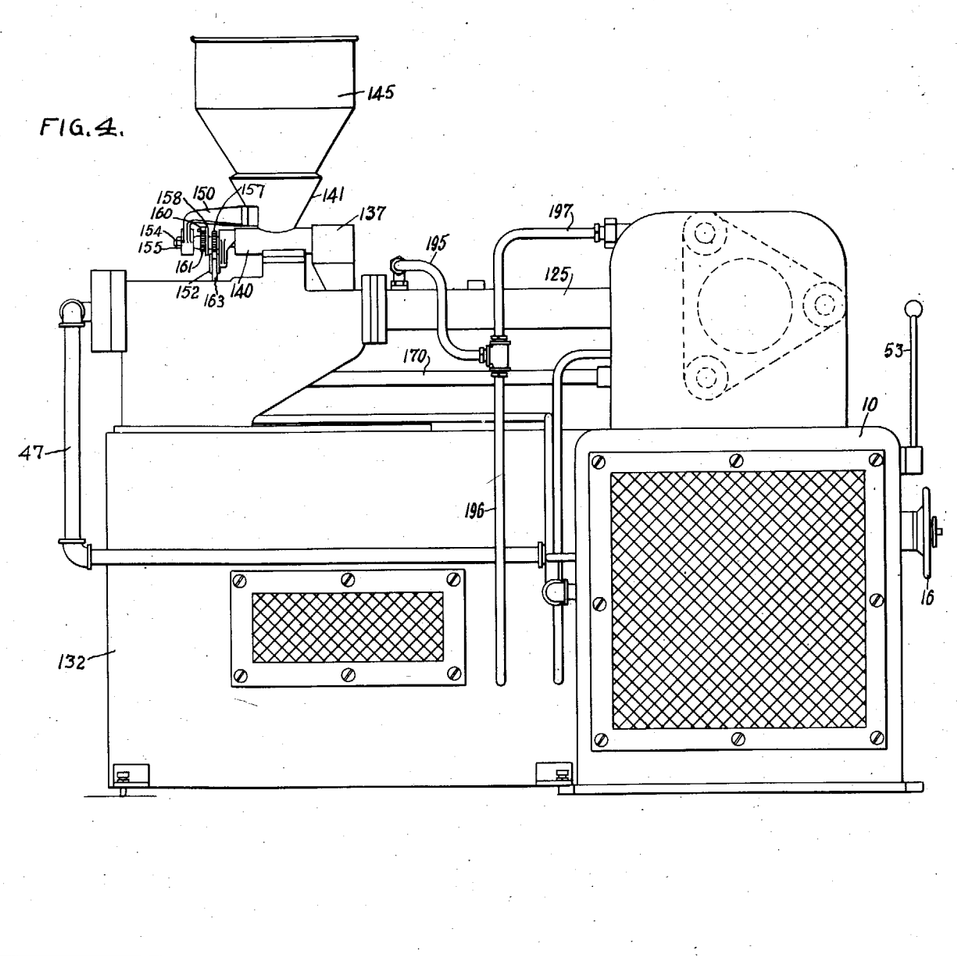
Figure 4 is a left-hand end elevation of the press.
Figure 5:
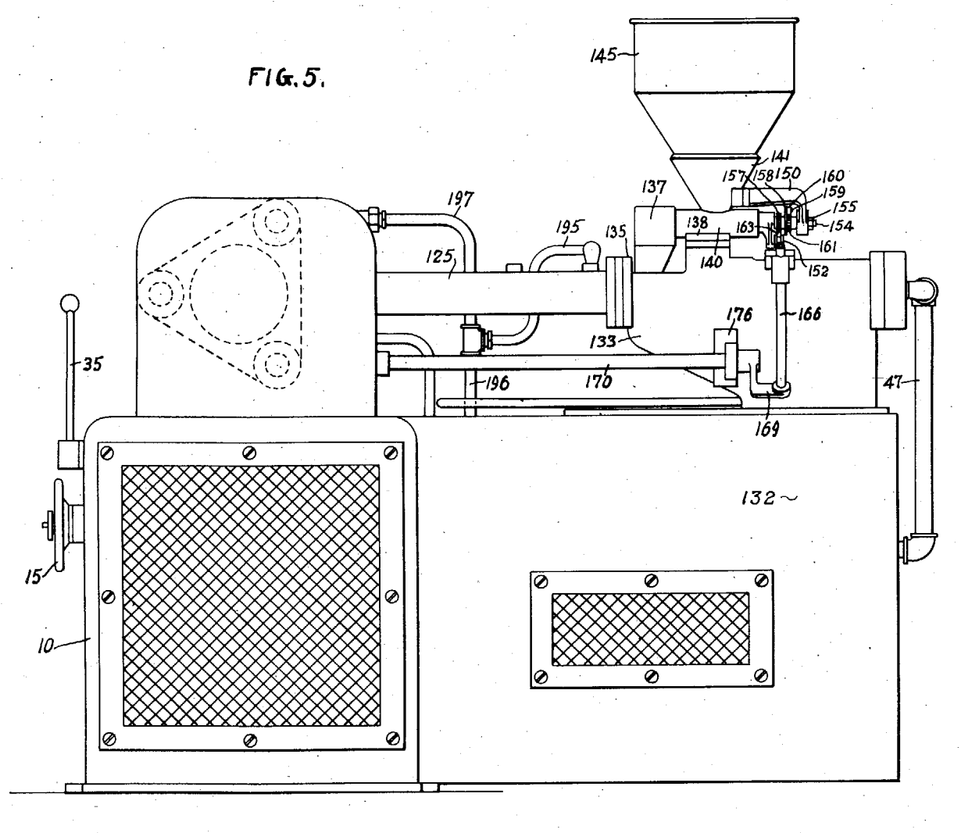
Figure 5 is a right-hand end elevation of the press.
Figure 6:
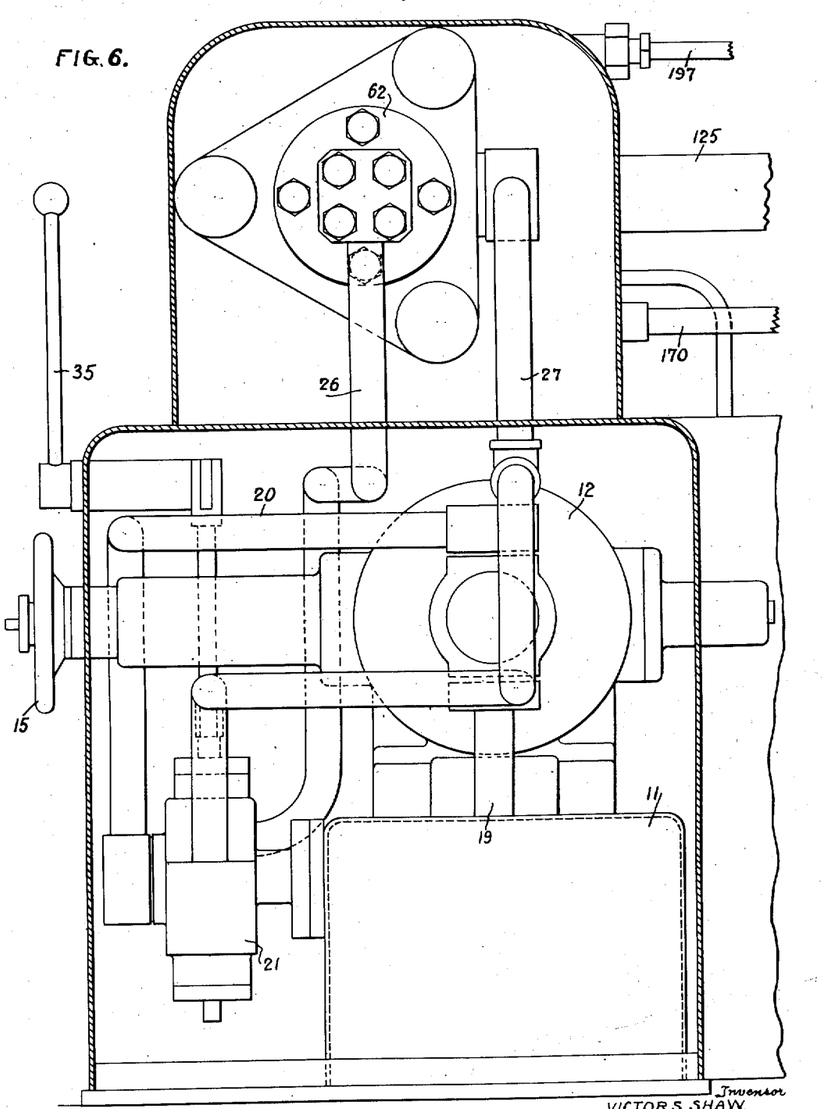
Figure 6 is an enlarged view of a portion of Figure 5, with portions of the casing removed to show the interior mechanism, on the line 6—6 of Figure 2.

When the molding operation is completed the hand levers 35 and 53 are moved away from one another into the position shown in Figure 11, whereupon the various plungers are retracted, in the manner previously described, and returned to their original positions. As the die member 81 nears its retracted position the ends of the knock-out rod 83 engage the ends of the threaded stop members 86, bringing the rod to a halt, while the die member 81 continues its motion to the left (Figure 11). This causes the knock-out pin 84 to push the molded article out of the recesses 79 of the die member 81, expelling the article and causing it to drop into the chute 205 (Figure 3), whence it emerges through the mouth 206 thereof (Figure 1) and falls into any suitable container.

When the advance of the injector piston rod 90 occurs it moves the collar 182 forwardly and causes the rack 163 to bring about a rotation of the screw conveyor 146, in the manner previously described in connection with the construction thereof. A measured charge of the plastic material falls through the funnel 137 and the aperture 136, into the bore 135, whence it is impelled into the bore 126 upon the subsequent stroke of the plunger 127. Upon the return or retraction stroke of the injection piston rod 90, however, the rack 163 does not rotate the screw conveyor 146, due to the slippage of the pawl 160 over the ratchet wheel 161.

The thermostat 187 controls the electrical heating unit 184 to maintain the oil within the reservoir 183 at a substantially constant temperature in response to the temperature of the oil impinging upon the bulb 199 of the thermostat (Figure 7). If the by-pass valve 198 is completely closed the heated oil will pass through the various chambers and make a complete circuit, maintaining these chambers at substantially the same temperature. If, however, it is desired to maintain a difference in temperature between the chamber surrounding the charging cylinder and that surrounding the injection cylinder, the by-pass valve 198 is partially opened so that a portion of the fluid flows through the by-pass line 197 back to the reservoir 183 without passing through the chamber surrounding the charging cylinder 124. The by-pass valve 198 may be manipulated until the desired temperature differential is obtained between the various chambers.

Hitherto in injection or extrusion presses a single high pressure pump has been employed to perform the functions both of clamping and of extrusion or injection, assisted in some instances, by a flash pressure device or by check valves to trap the high pressure oil in the clamping cylinder while the high pressure pump actuated the extrusion or injection plunger. Where a second pump was employed it was merely a large volume, low pressure pump, serving solely to rapidly traverse the clamping plunger in order to close the dies.

In the present invention it will be seen that I have provided separate high pressure pumps, each with its own automatic pressure control, to supply pressure fluid separately to the clamping plungers and extrusion or injection plunger. In this manner it is possible to run the extrusion or injection pressure at a lower level than the clamping pressure, and such a feature has been found valuable in the practical operation of such presses. In this connection, it is apparent that the die area which the press will handle is directly proportional to the clamping pressure and inversely proportional to the extrusion pressure. It is therefore sometimes desirable to run the clamping pressure up to the maximum and keep the extrusion pressure as low as is practical with the material being handled.

In the present invention the high pressure pump 12 is of relatively large capacity and is so connected in the circuit that it serves the function of rapidly traversing the clamping plunger and also the feeding plunger on both their forward and return strokes, thus serving the purpose of an additional low pressure booster pump. During the extrusion or injection stroke both the clamping and feeding plungers are at rest, with their pressure being held at these points by the small high pressure pump 13, and during this forward extrusion stroke the extrusion or injection is carried out solely by the large high pressure pump 12. This pump 12 enables the elimination of flash pressure devices previously used.

It will be understood that I desire to comprehend within my invention such modifications as come within the scope of the claims and the invention.

Having thus fully described my invention, what I claim as new and desire to secure by Letters Patent, is:

1. In combination, movable die means, devices for moving said die means into a closed position, an injector adapted to inject molding material into said die means, and mechanism automatically responsive to and synchronized with the operation of said injector for measuring out and distributing measured charges of molding material to said injector.

2. In combination, movable die means, devices for moving said die means into a closed position, an injector adapted to inject molding material into said die means, and mechanism automatically responsive to and synchronized with the operation of said injector for measuring out and distributing measured charges of molding material to said injector, said mechanism being operative upon the retraction stroke only of said injector.

3. A measuring and charging device for supplying material to a machine with a material injecting element comprising a charging chamber, a charging member therein, a measuring casing communicating therewith, a measuring member within said casing adapted when moved to measure out and feed a predetermined charge of material, and means automatically responsive to the operation of the material injecting element of said machine for actuating said measuring member to measure out and feed a predetermined charge of material to said charging chamber.

4. A measuring and charging device for supplying material to a machine with a material injecting element comprising a charging chamber, a charging member therein, a measuring casing, a screw conveyor member therein adapted when rotated to measure out and feed a predetermined charge of material, and means responsive to the motion of the material injecting element of said machine for rotating said screw conveyor to measure out and feed a predetermined charge of material to said charging chamber.

5. A measuring and charging device for supplying material to a machine with a material injecting element comprising a charging chamber, a charging member therein, a measuring casing, a screw conveyor member therein adapted when rotated to measure out and feed a predetermined charge of material, a gear on said conveyor, a rack engaging said gear, and means responsive to the motion of the material injecting element of said machine for moving said rack to operate said conveyor to measure out and feed a predetermined charge of material to said charging chamber.

6. A measuring and charging device for supplying material to a machine with a material injecting element comprising a charging chamber, a charging member therein, a measuring casing, a screw conveyor member therein adapted when rotated to measure out and feed a predetermined charge of material, a gear on said conveyor, a rack engaging said gear, means responsive to the motion of the material injecting element of said machine for moving said rack to operate said conveyor to measure out and feed a predetermined charge of material to said charging chamber, and ratchet means disposed between said rack and said conveyor and adapted to operate said conveyor by the motion in one direction only of said rack.

7. In combination, a pair of mutually engageable die members, a molding material injector therefor, hydraulic plungers for moving said die members into engagement with each other and with said injector, a hydraulic plunger for operating said injector, and measuring means synchronized with the motion of said injector plunger to measure out and supply measured charges of molding material to said injector.

8. An apparatus for treating heated materials comprising a machine having a plurality of material-treating chambers, a fluid container, fluid compartments adjacent said chambers for exchanging heat therewith, means for circulating the fluid from said container through said compartments, means for heating said fluid, and means for by-passing a portion of the fluid past one of said compartments whereby to establish a temperature differential between said chambers.

9. An apparatus for treating heated materials comprising a machine having a plurality of material-treating chambers, a fluid container, fluid compartments adjacent said chambers for exchanging heat therewith, means for circulating the fluid from said container through said compartments, means for heating said fluid, means for by-passing a portion of the fluid past one of said compartments whereby to establish a temperature differential between said chambers, and thermostatic means for maintaining a substantially constant temperature in said fluid container.

10. An apparatus for treating heated materials comprising a machine having a plurality of material-treating chambers, a fluid container, fluid compartments adjacent said chambers for exchanging heat therewith, means for circulating the fluid from said container through said compartments, means for heating said fluid, means for by-passing a portion of the fluid past one of said compartments whereby to establish a temperature differential between said chambers, thermostatic means for maintaining a substantially constant temperature in said fluid container, and a valve in said by-passing means for controlling the proportionate quantity of fluid by-passed.

11. An injection molding press circuit comprising a plurality of dies, a hydraulic clamping plunger for said dies, a molding material injection member, an injection plunger therefor, and independent means for separately supplying pressure fluid to said clamping plunger and said injection plunger, said last named means including mechanism for actuating said clamping die plunger at a higher pressure than said injection plunger.

12. An injection molding press circuit comprising a plurality of dies, a hydraulic clamping plunger for said dies, a molding material injection member, an injection plunger therefor, a variable delivery pump for supplying pressure fluid to said clamping plunger, means responsive to the attainment of a predetermined pressure in the clamping circuit for shifting said pump to its neutral delivery position, a second variable delivery pump for supplying pressure fluid to said injection plunger, and means responsive to the attainment of a predetermined pressure in the injection circuit for shifting said second pump to its neutral delivery position, said last named means including mechanism for actuating said clamping die plunger at a higher pressure than said injection plunger.

VICTOR S. SHAW.

DISCLAIMER 2,107,190.—*Victor S. Shaw*, Cardington, Ohio. PLASTIC EXTRUSION MOLDING PRESS. Patent dated February 1, 1938. Disclaimer filed February 25, 1939, by the assignee, *The Hydraulic Press Corporation, Inc.*; the patentee joining and concurring.

Hereby enters this disclaimer to claims 1, 2, and 3 of said Letters Patent.

[*Official Gazette March 21, 1939.*]

7. In combination, a pair of mutually engageable die members, a molding material injector therefor, hydraulic plungers for moving said die members into engagement with each other and with said injector, a hydraulic plunger for operating said injector, and measuring means synchronized with the motion of said injector plunger to measure out and supply measured charges of molding material to said injector.

8. An apparatus for treating heated materials comprising a machine having a plurality of material-treating chambers, a fluid container, fluid compartments adjacent said chambers for exchanging heat therewith, means for circulating the fluid from said container through said compartments, means for heating said fluid, and means for by-passing a portion of the fluid past one of said compartments whereby to establish a temperature differential between said chambers.

9. An apparatus for treating heated materials comprising a machine having a plurality of material-treating chambers, a fluid container, fluid compartments adjacent said chambers for exchanging heat therewith, means for circulating the fluid from said container through said compartments, means for heating said fluid, means for by-passing a portion of the fluid past one of said compartments whereby to establish a temperature differential between said chambers, and thermostatic means for maintaining a substantially constant temperature in said fluid container.

10. An apparatus for treating heated materials comprising a machine having a plurality of material-treating chambers, a fluid container, fluid compartments adjacent said chambers for exchanging heat therewith, means for circulating the fluid from said container through said compartments, means for heating said fluid, means for by-passing a portion of the fluid past one of said compartments whereby to establish a temperature differential between said chambers, thermostatic means for maintaining a substantially constant temperature in said fluid container, and a valve in said by-passing means for controlling the proportionate quantity of fluid by-passed.

11. An injection molding press circuit comprising a plurality of dies, a hydraulic clamping plunger for said dies, a molding material injection member, an injection plunger therefor, and independent means for separately supplying pressure fluid to said clamping plunger and said injection plunger, said last named means including mechanism for actuating said clamping die plunger at a higher pressure than said injection plunger.

12. An injection molding press circuit comprising a plurality of dies, a hydraulic clamping plunger for said dies, a molding material injection member, an injection plunger therefor, a variable delivery pump for supplying pressure fluid to said clamping plunger, means responsive to the attainment of a predetermined pressure in the clamping circuit for shifting said pump to its neutral delivery position, a second variable delivery pump for supplying pressure fluid to said injection plunger, and means responsive to the attainment of a predetermined pressure in the injection circuit for shifting said second pump to its neutral delivery position, said last named means including mechanism for actuating said clamping die plunger at a higher pressure than said injection plunger.

VICTOR S. SHAW.

DISCLAIMER 2,107,190.—*Victor S. Shaw*, Cardington, Ohio. PLASTIC EXTRUSION MOLDING PRESS. Patent dated February 1, 1938. Disclaimer filed February 25, 1939, by the assignee, *The Hydraulic Press Corporation, Inc.;* the patentee joining and concurring.

Hereby enters this disclaimer to claims 1, 2, and 3 of said Letters Patent.

[*Official Gazette March 21, 1939.*]

DISCLAIMER 2,107,190.—*Victor S. Shaw*, Cardington, Ohio. PLASTIC EXTRUSION MOLDING PRESS. Patent dated February 1, 1938. Disclaimer filed February 25, 1939, by the assignee, *The Hydraulic Press Corporation, Inc.;* the patentee joining and concurring.

Hereby enters this disclaimer to claims 1, 2, and 3 of said Letters Patent.

[*Official Gazette March 21, 1939.*]